Patented Oct. 23, 1934

1,978,269

UNITED STATES PATENT OFFICE 1,978,269

MANUFACTURE OF ETHYL ALCOHOL

Walter Philip Joshua, London, Herbert Muggleton Stanley, Tadworth, and John Blair Dymock, Cheam, England, assignors to The Distillers Company Limited, Edinburgh, Scotland, a British company No Drawing. Application January 11, 1933, Serial No. 651,224. In Great Britain February 19, 1932

14 Claims. (Cl. 260—156)

The present invention relates to the production of ethyl alcohol by the direct combination of ethylene with water vapor.

It is well known that water vapor and ethylene will combine with the formation of ethyl alcohol at high temperatures and without the presence of substances having a catalytic effect on the reaction but the amount of conversion is negligible. A number of catalysts have been proposed for use in this reaction such as for example thoria or phosphoric acid on charcoal.

According to the present invention, ethylene and water vapor are caused to combine at high temperatures at atmospheric or increased pressures in the presence of a catalyst compounded from phosphoric acid with copper or its oxide or compound easily decomposable with phosphoric acid, the amount of phosphoric acid present in the catalyst being in excess of that required to form the ortho-phosphate of copper but not in excess of about 95% of the composition. In conjunction with this compound of copper one may also use the similar compound of manganese.

The catalyst so compounded may be used as such in the solid state in the form of granules, pellets, tablets, and so forth or may be supported and/or admixed with inert carriers and the latter may be impregnated with the catalyst in fluid form and used in such condition or may be subsequently dried. The inert carrier mentioned above should not consist of a silicious compound.

In the case of those compositions of catalyst in which the latter becomes fluid under the operating conditions it may be used in that form, and in such case ethylene and water vapor may be passed through the catalyst. The catalyst may be used alone or in conjunction with other materials known to have a favourable catalytic effect on the combination of steam and ethylene.

The reaction may be carried out at temperatures from 100 to 300° C., but we prefer to use temperatures above 150° C. Atmospheric pressure may be employed or increased pressures up to 250 atmospheres, but we prefer to use pressures not exceeding 100 atmospheres.

In carrying out the operation a mixture of ethylene and steam in suitable proportions is brought into contact with the catalyst and the resultant vapors are thereafter condensed to separate the ethyl alcohol produced together with any unchanged water vapor, and the unchanged ethylene is returned to be re-treated.

The catalyst may be prepared by treating with phosphoric acid the oxide, carbonate or other compound of copper or both copper and manganese decomposable by phosphoric acid.

The process may be applied to pure ethylene or to mixtures of ethylene with gases which are not reactive under the conditions of the process, e. g. ethane, methane and the like.

The following examples illustrate the manner in which the invention may be carried into effect and the nature of the results obtained:—

Example I 100 cc. of a catalyst having the following proportions—copper oxide 1 mol., phosphoric acid 2 mols.—was dried at 200° C. and at this temperature a mixture of ethylene and steam at atmospheric pressure was passed over it at the rate of 3.12 litres of ethylene per hour measured at N. T. P. in admixture with 1.5 times its volume of steam. The conversion of ethylene to ethanol was 1.03%.

Example II

The action of the same catalyst as used in Example I was examined under super-atmospheric conditions. Under a total pressure of 20 atmospheres the volume of ethylene measured at N. T. P. passing per hour over 100 cc. of the catalyst maintained at 270° C. was 400 litres mixed with steam in the molar proportions of 4 mols. ethylene to 1 mol. steam. The conversion of ethylene to ethanol was 0.85% and the hourly output of alcohol was 7.09 grammes. The alcohol was obtained in the form of a 7.57% condensate.

Example III

In a further experiment carried out under a total pressure of 40 atmospheres, the volume of ethylene calculated at N. T. P. passing per hour over the same volume of catalyst maintained at 300° C. was 1200 litres mixed with steam in the molar proportions of 5.4 mols. ethylene to 1 mol. steam. Conversion of ethylene to ethanol was 1.12% and the hourly output of alcohol was 22.1 grammes. The alcohol was obtained in the form of a 14.5% condensate.

Example IV

A catalyst consisting of 1 mol. manganese oxide, 1 mol. copper oxide and 4 mols. phosphoric acid was prepared and, after baking at 200° C. was submitted to examination under super-atmospheric conditions. Under a total pressure of 20 atmospheres the volume of ethylene measured at N. T. P. passing per hour over 100 cc. of catalyst maintained at 270° C. was 400 litres mixed with steam in the molar proportions of 4.1 mols. ethylene to 1 mol. steam. The conversion of ethylene to ethanol was 0.97% and the hourly output of alcohol was 7.91 grammes. The alcohol was obtained in the form of a 7.41% condensate.

*Example V*

A catalyst consisting of 1 mol. copper oxide, 1½ mols. manganese oxide and 6.05 mols. phosphoric acid was prepared and after baking at 200° C. was examined under super-atmospheric conditions. Under a total pressure of 20 atmospheres the volume of ethylene measured at N. T. P. passing per hour over 100 cc. of the catalyst maintained at 270° C. was 400 litres mixed with steam in the molar proportions of 3.8 mols. ethylene and 1 mol. steam. The conversion of ethylene to ethanol was 1.06% and the hourly output of alcohol was 8.85 grammes. The alcohol was obtained in the form of an 8.09% condensate.

What we claim is:—

1. The method of producing ethyl alcohol comprising combining ethylene with water vapor in the presence of a catalyst comprising essentially phosphoric acid and a substance containing a substantial quantity of copper which will react with the phosphoric acid to form the phosphate, the amount of the phosphoric acid present in the catalyst being in excess of the stoichiometric amount but not being in excess of about 95% of the composition.

2. The method of producing ethyl alcohol comprising combining ethylene with water vapor in the presence of a catalyst comprising essentially phosphoric acid and copper, the amount of the phosphoric acid present in the catalyst being in excess of the stoichiometric amount but not being in excess of about 95% of the composition.

3. The method of producing ethyl alcohol comprising combining ethylene with water vapor at a temperature between 100° C. and 300° C. in the presence of a catalyst comprising essentially phosphoric acid and a substance containing a substantial quantity of copper which will react with the phosphoric acid to form the phosphate, the amount of the phosphoric acid present in the catalyst being in excess of the stoichiometric amount but not being in excess of about 95% of the composition.

4. The method of producing ethyl alcohol comprising combining ethylene with water vapor at a temperature between 100° C. and 300° C. in the presence of a catalyst comprising essentially phosphoric acid and copper, the amount of the phosphoric acid present in the catalyst being in excess of the stoichiometric amount but not being in excess of about 95% of the composition.

5. The method of producing ethyl alcohol comprising combining ethylene with water vapor at atmospheric pressure in the presence of a catalyst comprising essentially phosphoric acid and a substance containing a substantial quantity of copper which will react with the phosphoric acid to form the phosphate, the amount of the phosphoric acid present in the catalyst being in excess of the stoichiometric amount but not being in excess of about 95% of the composition.

6. The method of producing ethyl alcohol comprising combining ethylene with water vapor at atmospheric pressure in the presence of a catalyst comprising essentially phosphoric acid and copper, the amount of the phosphoric acid present in the catalyst being in excess of the stoichiometric amount but not being in excess of about 95% of the composition.

7. The method of producing ethyl alcohol comprising combining ethylene with water vapor at superatmospheric pressure up to about 100 atmospheres in the presence of a catalyst comprising essentially phosphoric acid and a substance containing a substantial quantity of copper which will react with the phosphoric acid to form the phosphate, the amount of the phosphoric acid present in the catalyst being in excess of the stoichiometric amount but not being in excess of about 95% of the composition.

8. The method of producing ethyl alcohol comprising combining ethylene with water vapor at superatmospheric pressure up to about 100 atmospheres in the presence of a catalyst comprising essentially phosphoric acid and copper, the amount of the phosphoric acid present in the catalyst being in excess of the stoichiometric amount but not being in excess of about 95% of the composition.

9. The method of producing ethyl alcohol comprising combining ethylene with water vapor at a temperature between 100° C. and 300° C. and at super-atmospheric pressure up to about 100 atmospheres in the presence of a catalyst comprising essentially phosphoric acid and a substance containing a substantial quantity of copper which will react with the phosphoric acid to form the phosphate, the amount of the phosphoric acid present in the catalyst being in excess of the stoichiometric amount but not being in excess of about 95% of the composition.

10. The method of producing ethyl alcohol comprising combining ethylene with water vapor at a temperature between 100° C. and 300° C. and at super-atmospheric pressure up to about 100 atmospheres in the presence of a catalyst comprising essentially phosphoric acid and copper, the amount of the phosphoric acid present in the catalyst being in excess of the stoichiometric amount but not being in excess of about 95% of the composition.

11. The method of producing ethyl alcohol comprising combining ethylene in admixture with a gaseous medium that is not reactive under the operating conditions with water vapor in the presence of a catalyst comprising essentially phosphoric acid and a substance containing a substantial quantity of copper which will react with the phosphoric acid to form the phosphate, the amount of the phosphoric acid present in the catalyst being in excess of the stoichiometric amount but not being in excess of about 95% of the composition.

12. The method of producing ethyl alcohol comprising combining ethylene in admixture with a gaseous medium that is not reactive under the operating conditions with water vapor in the presence of a catalyst comprising essentially phosphoric acid and copper, the amount of the phosphoric acid present in the catalyst being in excess of the stoichiometric amount but not being in excess of about 95% of the composition.

13. The method of producing ethyl alcohol comprising combining ethylene with water vapor at elevated temperature in the presence of a catalyst comprising essentially phosphoric acid and a substance containing a substantial quantity of copper which will react with the phosphoric acid to form the phosphate, the amount of the phosphoric acid present in the catalyst being in excess of the stoichiometric amount but not being in excess of about 95% of the composition.

14. The method of producing ethyl alcohol comprising combining ethylene with water vapor at elevated temperature in the presence of a catalyst comprising essentially phosphoric acid and copper, the amount of the phosphoric acid present in the catalyst being in excess of the stoichiometric amount but not being in excess of about 95% of the composition.

WALTER PHILIP JOSHUA.
HERBERT MUGGLETON STANLEY.
JOHN BLAIR DYMOCK.